United States Patent

Balachandran et al.

[11] Patent Number: 6,115,394
[45] Date of Patent: Sep. 5, 2000

[54] METHODS, APPARATUS AND COMPUTER PROGRAM PRODUCTS FOR PACKET TRANSPORT OVER WIRELESS COMMUNICATION LINKS

[75] Inventors: Kumar Balachandran, Cary; Havish Koorapaty; David R. Irvin, both of Raleigh, all of N.C.

[73] Assignee: Ericsson Inc., Research Triangle Park, N.C.

[21] Appl. No.: 09/034,424

[22] Filed: Mar. 4, 1998

[51] Int. Cl.⁷ .................................................. H04B 1/66
[52] U.S. Cl. ............................ 370/477; 370/389; 370/475
[58] Field of Search ..................................... 370/338, 389, 370/392, 393, 465, 468, 470, 471, 475, 477, 521; 375/240

[56] References Cited

U.S. PATENT DOCUMENTS

| | | | |
|---|---|---|---|
| 5,131,016 | 7/1992 | Broughton et al. | 370/477 |
| 5,293,379 | 3/1994 | Carr | 370/477 |
| 5,307,413 | 4/1994 | Denzer | 370/521 |
| 5,414,701 | 5/1995 | Shtayer et al. | 370/58.2 |
| 5,446,736 | 8/1995 | Gleeson et al. | 370/85.13 |
| 5,483,556 | 1/1996 | Pillan et al. | 370/340 |
| 5,521,940 | 5/1996 | Lane et al. | 375/240 |
| 5,535,199 | 7/1996 | Amri et al. | 370/521 |
| 5,561,662 | 10/1996 | Kakuma et al. | 370/477 |
| 5,572,530 | 11/1996 | Chitre et al. | 370/110.1 |

OTHER PUBLICATIONS

Rousseau, M., Protocoles de Transmission de Donnees X.25, *Micro Systemes*, No. 74, pp. 94–100 (Apr. 1, 1987).
Degermark, Mikael, et al., Loss–loss TCP/IP header compression for wireless networks, *Wireless Networks*, vol. 3, No. 5, pp. 375–387 (Oct. 1, 1997).
International Search Report for PCT/US99/03380.

*Primary Examiner*—Chi H. Pham
*Assistant Examiner*—Ricky Q. Ngo
*Attorney, Agent, or Firm*—Myers Bigel Sibley & Sajovec

[57] ABSTRACT

Methods, systems and computer program products are provide which reduce overhead in the communication of messages having a message header over a communication link. An alias address is selected from a predefined set of alias addresses and associated with a portion of the header of the message. If no unused alias addresses are available the least recently used alias address is associated with the portion of the message header. The portion of the message header is removed from the message and the alias address substituted. This reduced data message is then transmitted. The number of alias addresses may be increased to avoid churning of alias addresses. The message is reconstructed based on the alias address and the associated portion of the original message.

39 Claims, 8 Drawing Sheets

| 7E | Alias Address (A) | Type (2 bytes) | Data (46-576 bytes) | 7E |
|---|---|---|---|---|

FIG. 2B

| 7E | 00 | Source (6 bytes) | Destination (6 bytes) | Alias Address (A) | 7E |
|---|---|---|---|---|---|

FIG. 2C

| 7E | 01 | Source (6 bytes) | Destination (6 bytes) | Alias Address (A) | 7E |
|---|---|---|---|---|---|

| Single byte address field |
| --- |
| 0xxxxxxx |

FIG. 5B

| Extended address field |
| --- |
| 1xxxxxxx \| xxxxxxxx |

FIG. 5C

| 7E | Alias Address (1 or 2 bytes) | Type (2 bytes) | Data (46-576 bytes) | 7E |
|---|---|---|---|---|

FIG. 5D

| 7E | 02 | Source (6 bytes) | Destination (6 bytes) | Alias Address (A) (2 bytes) | 7E |
|---|---|---|---|---|---|

FIG. 5E

| 7E | 03 | Source (6 bytes) | Destination (6 bytes) | Alias Address (A) (2 bytes) | 7E |
|---|---|---|---|---|---|

METHODS, APPARATUS AND COMPUTER PROGRAM PRODUCTS FOR PACKET TRANSPORT OVER WIRELESS COMMUNICATION LINKS

FIELD OF THE INVENTION

The present invention relates to communication networks and more particularly to communications networks which utilize packet communication protocols such as the Ethernet protocol.

BACKGROUND OF THE INVENTION

In computing and communications it has become commonplace to network computers or other data processing devices. One problem with networking processing systems relates to the infrastructure necessary to communicate between processors. Typically, communication occurs over a hardwired interface utilizing a communication protocol such as the Ethernet protocol. However, this infrastructure is not always available or, it may be impractical in certain environments or for certain applications to create a fixed infrastructure. For example, in a residential building it may be impractical or prohibitively expensive to wire the structure for a computer network. Similarly, in a business environment, portable processing systems may need to be moved from location to location while still maintaining a link to a network.

As a result of these and other such situations, wireless and other communication systems which reduced the amount of fixed infrastructure have been utilized as the mechanism for communication between processing systems. However, wireless systems have typically been either expensive to operate or had reduced bandwidth in comparison to hard-wired systems. While a dedicated wireless system may be operated at increased speed, often, these wireless networks are integrated with existing hard-wired networks and, thus, it may be desirable to use the existing networking protocols such as Ethernet, token ring or the networking protocols. However, the Ethernet protocol and other conventional networking protocols were not developed for use in a wireless environment and may be inefficient when operated in a wireless network environment.

In light of the above discussion, a need exists for increased performance in wireless communications so as to more efficiently allow operation of existing communication protocols over wireless communication links.

SUMMARY OF THE INVENTION

In view of the above discussion, it is an object of the present invention to provide improved efficiency in networking computers over wireless and other reduced bandwidth communication links.

A further object of the present invention is to provide an increase in throughput over reduced bandwidth communication links which is transparent to users of the communication links.

Still another object of the present invention is to provide increased throughput of a communication link while remaining compatible to existing networking protocols.

These and other objects of the present invention are provided by methods, systems and computer program products which reduce overhead in the communication of messages having a message header over a communication link. This reduction in overhead may be accomplished after receiving a message to be transmitted on the communication link by determining if an unused alias address from a first predefined set of alias addresses is available. If an unused alias address is available, the unused alias address is associated with at least a portion of the header of the received message. If an unused alias address is not available, a used alias address from the first predefined set of alias addresses is associated with at least a portion of the header of the received message. At least a portion of the message header from a subsequent message having a message header, a portion of which is substantially identical the message header of the received message, is then removed to provide a reduced data message. The reduced data message and the associated alias address are then transmitted on the communication link. The communication link may be a wireless communication link.

By associating an alias address with header information of a message, the alias address may be substituted for the header information. This substitution may result in fewer bytes of data being transmitted over the communication link. Furthermore, by automatically selecting used links which have not been recently used the present invention eliminates the need to "take down" a link which has previously been established. Thus, no overhead is associated with removing an unused link.

In a particular embodiment of the present invention, the alias address and at least a portion of the message header associated with the message are transmitted on the communication link. A confirmation of the association of the portion of the message header and the associated alias address may also be received from the communication link. A transmitted reduced data message may then be received from the communication link and the subsequent message reconstructed from the portion of the message header associated with the received alias address and the reduced data message.

By associating the alias address with a portion of the header of the original message and then reconstructing the original message based on the alias address, the present invention provides for reduced overhead per communication. The reduction in overhead may be achieved for any protocol with a header which identifies multiple packets in a message independent of the protocol of the original message because the original message is reconstructed to conform to the protocol but the format of the reduced data packet transmitted on the communication link may be independent of the format of the original message provided that the header information may be separated from the data portion of the message.

In another embodiment of the present invention, alias addresses associated with at least a portion of a message header are identified as used. However, used alias addresses may be associated with a portion of a message header by determining when each used alias address from the first predefined set of alias addresses was last utilized so as to provide a last time of use for each of the used alias addresses. A used alias address with the oldest last time of use is then associated with the portion of the header of the received message if an unused alias address is not available. Thus, the present invention may avoid the need to take down no longer used alias address associations.

In one particular embodiment of the present invention, the portion of the message header removed to create the reduced data message includes a source address and a destination address of the message.

In another embodiment of the present invention, the association of alias addresses with the message headers is monitored. The number of alias addresses in the first predefined set of alias addresses is increased based upon the monitoring so as to provide a second predefined set of alias address.

By monitoring the association of alias addresses, the present invention may selectively increase the number of available addresses to reduce the amount of communication bandwidth utilized to establish alias address associations. Thus, the number of available addresses may be dynamically adjusted to reduce the likelihood of "churning" of alias addresses.

In a further embodiment of the present invention, alias addresses are removed from the second predefined set of alias addresses if the alias addresses are determined to be inactive. In particular, where the second predefined set of alias addresses comprises a combination of the first predefined set of alias addresses and a third predefined set of alias addresses, the number of alias addresses may be reduced to the first predefined set of alias addresses if all of the third predefined set of alias addresses have been removed from the second predefined set of alias addresses. Thus, the number of alias addresses may also be dynamically reduced if the number of alias addresses needed to avoid churning declines.

As will further be appreciated by those of skill in the art, the present invention may be embodied as a method, apparatus/system or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
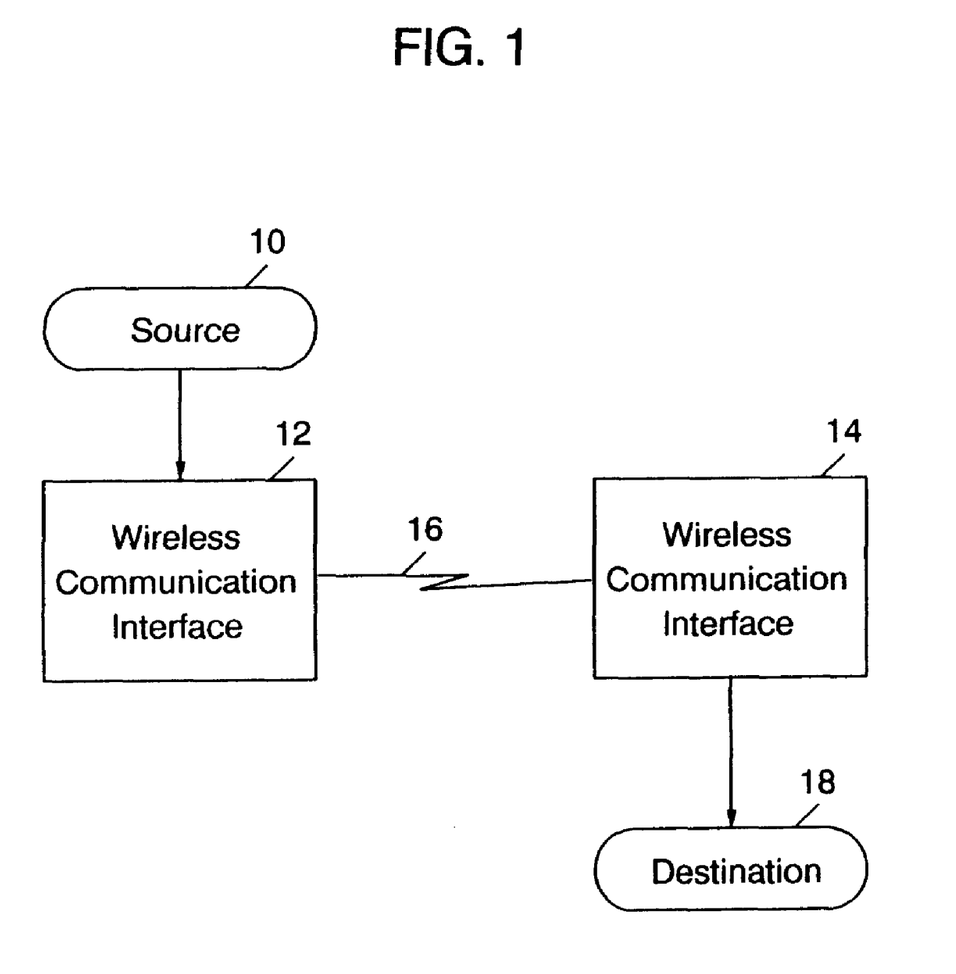
FIG. 1 is block diagram of a communication system utilizing one embodiment of the present invention.

FIG. 1 illustrates one embodiment of the present invention. As seen in FIG. 1, a source 10 for a communication message has access to a wireless communication interface 12. A destination of the communication message has access to a second wireless communication interface 14 which communicates with the first wireless communication interface 12 over wireless communication link 16.

In a particular embodiment of the present invention the source 10 and destination 18 are Ethernet sources and destinations. In such a case the communications interfaces 12 and 14 may be wireless Ethernet adapters or other adapters capable of transmitting Ethernet packets over a wireless communication link. The source and destination devices may be network computers, workstations, personal computers, personal information managers or other devices capable of acting as the source or destination of a data packet in a packet communication protocol such as the Ethernet communication protocol.

While the present invention is described herein with reference to the Ethernet protocol, as will be appreciated by those of skill in the art, other packet based communication protocols may also benefit from the teachings of the present invention. For example, Transport Control Protocol/Internet Protocol (TCP/IP), Asynchronous Transfer Mode (ATM) protocol and other such packet communication based protocols may be utilized with the teachings of the present invention.

Furthermore, the present invention is described herein with reference to wireless communication links, however, the present invention should not be construed as limited to wireless communications. As used herein the term communication link refers to any type of link between two processors remote from each other which allows communications between the two processors. The teachings of the present invention may be beneficial to any communication link where the amount of data to be transmitted over the communication link is to be reduced. Examples of such communication links includes low-speed modem communications, satellite communication links, cellular communication links, radio frequency communication links, microwave communication links or any communication link with a rate schedule based on the amount of data transferred across the communication link.

FIG. 1 illustrates a single source and a single destination which may communicate through communication link 16. However, as will be appreciated by those of skill in the art, multiple sources and destinations may be accessible through communication interfaces 12 and 14. Furthermore, the communication between a source and a destination may be in either direction across communication link 16. Communication interfaces 12 and 14 may each provide access to both sources and destinations which utilize communication interfaces 12 and 14 to communicate across communication link 16. Accordingly, FIG. 1 is exemplary and should not be construed as limiting the present invention.

In overview, the operation of certain embodiments of the present invention provides for data reduction in the transmission of packets over a communication link, such as the wireless communication link 16, by reducing the header size of the communication packets. More specifically, data packets with routing information, such as destination and source addresses, are stripped of this header information prior to transmission on the communication link. An alias address is assigned to the header and the alias address is added to the data packet. As used herein the term "alias address" refers to a designation associated the header information of the original message such that the original message may be recreated knowing the alias address. The data and alias address are then transmitted on the communication link. The receiving side of the communication link receives the modified data packet and reconstructs the original data packet based on the alias address received. Subsequent messages with the same source and destination addresses are then also stripped of the source and destination address information and the associated alias address used for communication over the communication link. Because the alias address can be smaller than the corresponding source and destination address of the original header, the amount of data transmitted over the communication link may be reduced.

In specific aspects of the present invention, alias addresses are assigned to unused alias addresses until all of the alias addresses have been utilized. After all of the alias addresses have been utilized, when a data packet with a new source and destination is received for transmission on the communication link, the least recently used alias address is reassigned to the new source and destination addresses. Thus, the present invention may alter the alias address associations without the overhead of explicitly terminating previous alias address associations.

Furthermore, if it is determined that the assignment of alias addresses is occupying too large an amount of the bandwidth of the communication link, the size of the alias address may be expanded to reduce the rate at which reassignment occurs.

The specific operation of various embodiments of the present invention will now be described with respect to an Ethernet example and the block diagram of FIG. 1. Reference is also made to FIGS. 3, 4 and 6 through 8 which are flowchart illustrations of embodiments of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 3:
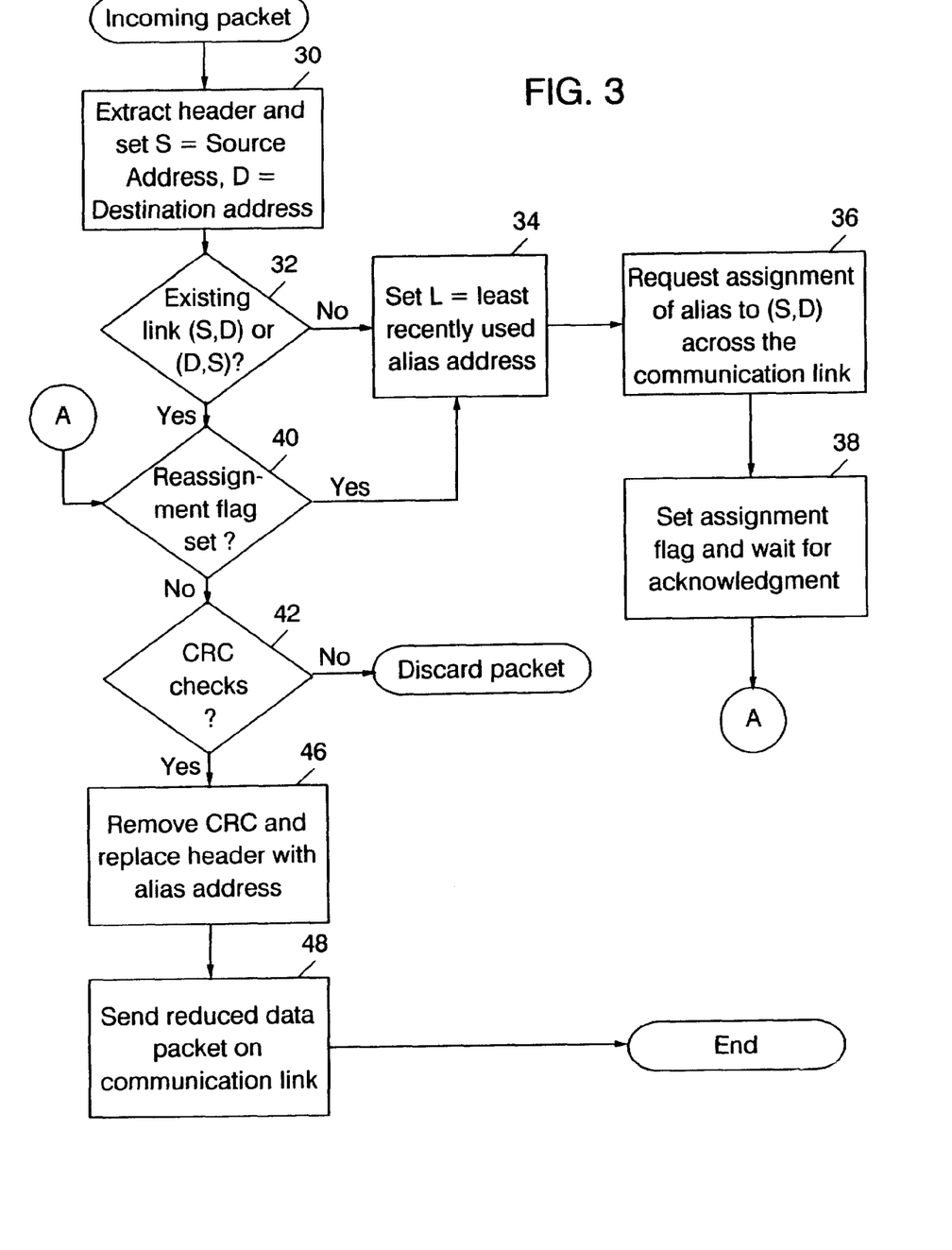
FIG. 3 is a flowchart illustrating operations carried out upon receipt of a packet by a communications interface according to one embodiment of the present invention.

FIG. 3 illustrates the operation of a communications interface, such as the wireless communications interface 12, when a data packet is received for transmission on a communication link, such as the wireless communication link 16. As is illustrated in FIG. 3, when the wireless communication interface 12 receives the data packet from source 10, the wireless communication interface 12 extracts the header from the data packet and determines the source and destination addresses from that header (block 30). It is then determined if an existing link (i.e. an alias address) has been associated with the source and destination address across the communication link 16 has been established for that source and destination address (block 32). If a link has not been established the least recently used alias address is assigned to the source and destination address (block 34) and a request is sent on the communication link 16 to assign the alias address to the source and destination address (block 36). The least recently used alias address will be an unused alias address if all alias addresses have not been assigned. In the present example, the alias address is one byte (8 bits) in size with 2 addresses ("00" and "01") being reserved for control so as to define a predefined set of 254 alias addresses such that 254 alias addresses would need to be assigned before a previously assigned alias address (used alias address) would be reused.

Figure 2A:
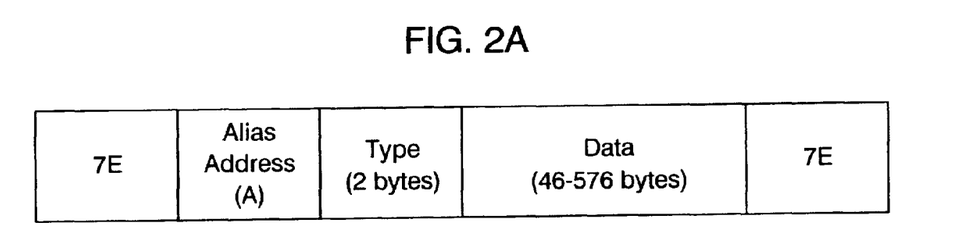
FIGS. 2A through 2C are illustrations of data packets utilized by one embodiment of the present invention.
Figure 2B:
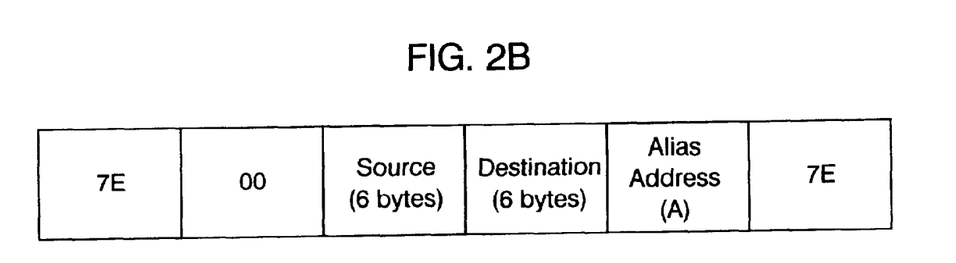

FIG. 2B illustrates a data packet transmitted on the communication link 16 by a communication interface 12 or 14 to request that a link be established. The format of the data packet includes "00" as the first byte of the data packet after the frame header. The "00" indicates that the packet is requesting that a link be established. The next 12 bytes of the packet specify the source and destination address of the original data packet. The source and destination addresses are then followed by one byte which specifies the requested alias address to be associated with the source and destination addresses. Utilizing the format illustrated in FIG. 2B a link request is a 16 byte packet.

Returning to FIG. 3, after transmitting the request to establish a link, the communication interface 12 and 14 sets a reassignment flag (block 38) which is used as part of a handshake with the receiving communication interface 14 or 12 to verify that the link is established (i.e. both sides of the communication link 16 have the same association of source and destination address to alias address) and waits for an acknowledgment packet to be received from the communication link 16. After receiving the acknowledgment, the communication interface 12 or 14 checks to see if the reassignment flag remains set (block 40). If the reassignment flag remains set then the request for the link failed and a new alias address is selected (block 34) and the process repeated (blocks 36 and 38). This process may be repeated until a link is established or may repeated for a finite number of attempts and, if still unsuccessful, the message may be discarded or an error notification provided to the source of the packet.

If the reassignment flag is not set (block 40), then a link has been established. The communication interface 12 or 14 then checks the CRC of the original packet (block 42) and discards the packet if a CRC error is indicated (block 44). Alternatively, the CRC check could be performed prior to establishing a link.

If no CRC error is detected, then the CRC and source and destination addresses are removed from the packet and replaced with the alias address (block 46). A format for the packet to be transmitted on the communication link 16 in the present Ethernet example is illustrated in FIG. 2A. As seen in FIG. 2A, the packet transmitted across the communication link 16 includes the frame header followed by the alias address (1 byte), followed by the message type (2 bytes) and then 46 to 576 bytes of data. After creation of the reduced data packet, the reduced data packet is transmitted on the communication link 16 (block 48).

The processing of subsequent data packets received by a communication interface 12 or 14 having the same alias address is also illustrated in FIG. 3. As is seen in FIG. 3, when the packet is received the header is extracted (block 30) and it is determined if a link exists (block 32). Because the packet is a subsequent packet, a link exists and the reassignment flag will not be set (block 40). The CRC of the packet is checked (block 42) and if no error is indicated the header information is removed (block 46) and the reduced data packet transmitted on the communication link 16 (block 48).

Figure 4:
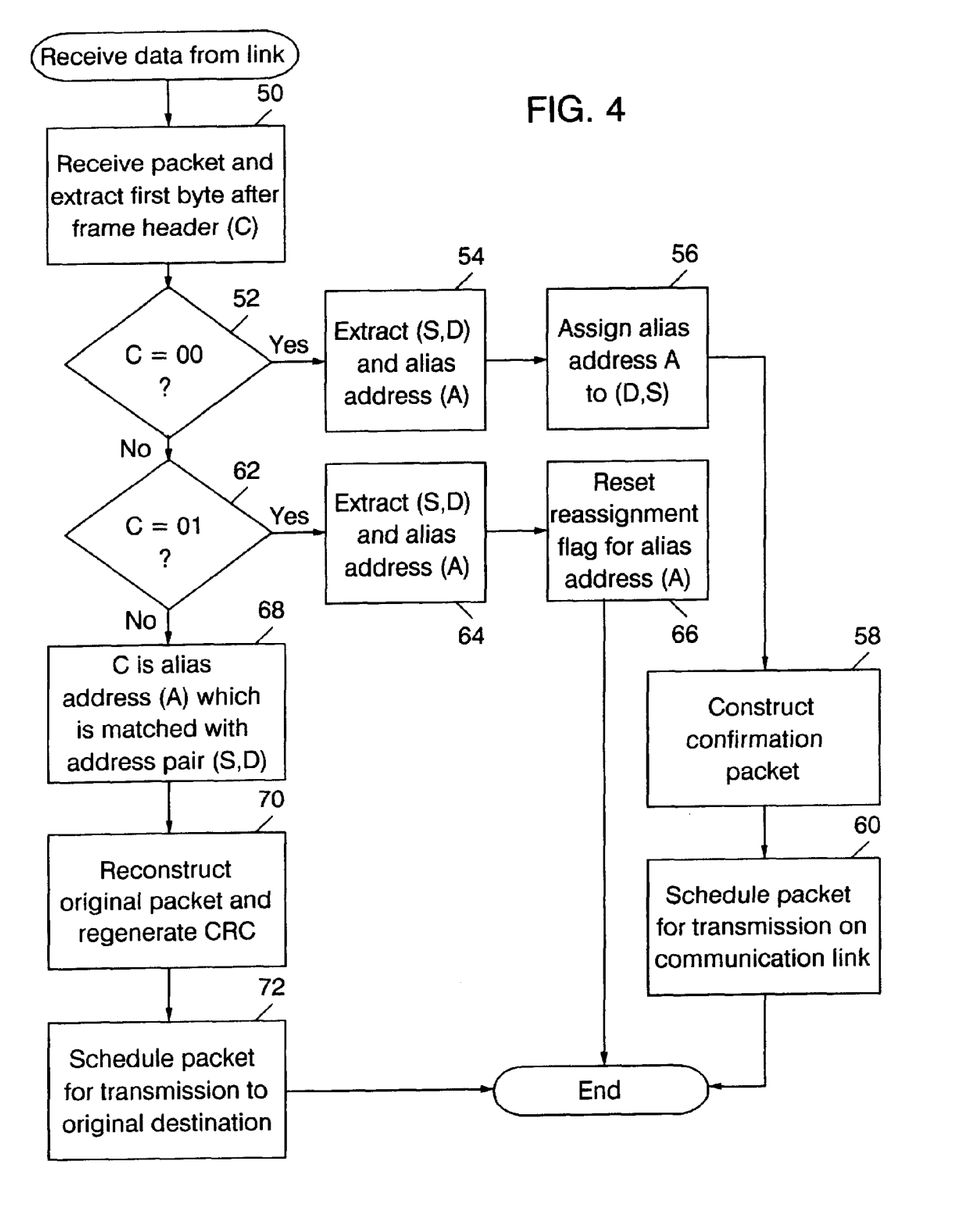
FIG. 4 is a flow chart illustrating operations carried out upon receipt of data from a communication link by a communications interface according to one embodiment of the present invention.

FIG. 4 illustrates the operations of a communication interface 12 or 14 according to one embodiment of the present invention when a packet is received from the communication link 16. When a packet is received, the first byte (C) after the frame header "7E" is extracted (block 50) and it is determined if the first byte after the frame header specifies a request to establish a link (C="00")(block 52). If the first byte after the frame header specifies a link request, the source, destination and alias address fields of the packet (see FIG. 2B) are extracted (block 54) and the alias address is associated with the source and destination addresses (block 56). A confirmation packet is then constructed (block 58) and scheduled for transmission on the communication link 16 (block 60).

Figure 2C:
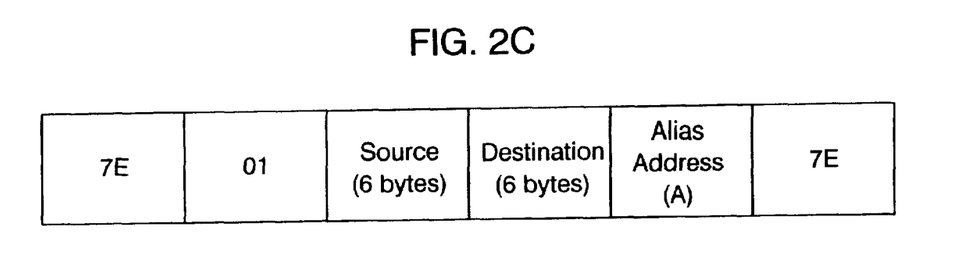

FIG. 2C illustrates a data packet transmitted on the communication link 16 by a communication interface 12 or 14 to confirm that a link has been established. The format of the data packet includes "01" as the first byte of the data packet after the frame header (C="01"). The "01" indicates that the packet is confirming that a link has been established. The next 12 bytes of the packet specify the source and destination address of the original data packet. The source and destination address are then followed by one byte which specifies the alias address which has been associated with the source and destination addresses. Utilizing the format illustrated in FIG. 2C a link confirmation packet is a 16 byte packet.

Returning to FIG. 4 at block 52, if the first byte after the frame header of the packet is not a "00" it is determined if the byte is a "01" (block 62) indicating that the packet is a confirmation packet as illustrated in FIG. 2C. If the first byte after the frame header specifies a link confirmation packet then the source, destination and alias address fields of the packet (see FIG. 2C) are extracted (block 64) and the reassignment flag associated with the alias address is reset (block 66). Processing then continues as described above with respect to FIG. 3 to transmit the data of the original packet over the communication link 16.

If the first byte after the frame header is not "00" or "01" then the packet is a data packet of the format specified in FIG. 2A. The first byte after the frame header then specifies the alias address of the packet which is matched with the source and destination address pair associated with the alias address (block 68). The original packet is then reconstructed and scheduled for transmission to the original destination 18 (block 72).

FIG. 5A through 8 illustrate an alternative embodiment of the present invention where the size of the alias address may be expanded. Such an embodiment reduces the likelihood of "churning" of alias addresses. Because there is some overhead associated with establishing a link which associates the alias address with the source and destination addresses a condition may arise where a large percentage of the communication link 16 bandwidth is taken up by packets which establish links. The onset of this condition, referred to herein as "churning," may be delayed or prevented by expanding the alias address field to include two bytes of address data, thus substantially increasing the number of available alias addresses and reducing the frequency of alias address reassignments.

Figure 5A:
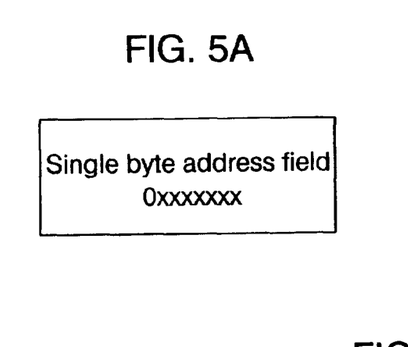
FIGS. 5A through 5E are illustrations of data packets utilized by an alternative embodiment of the present invention.
Figure 5B:
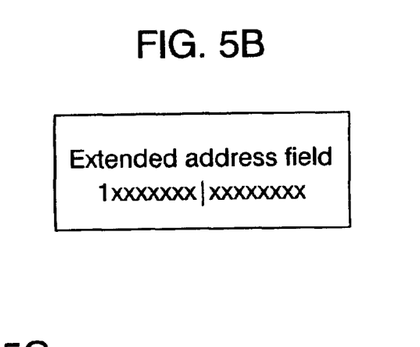

FIGS. 5A and 5B illustrate examples of the single byte and double byte addresses associated with the alternative embodiment of the present invention. As seen in FIG. 5A, the first bit of the single byte address is set to "0" to indicate the single byte address. FIG. 5B illustrates that the first bit of the extended address field is set to "1" to indicate an extended address.

Figure 6:
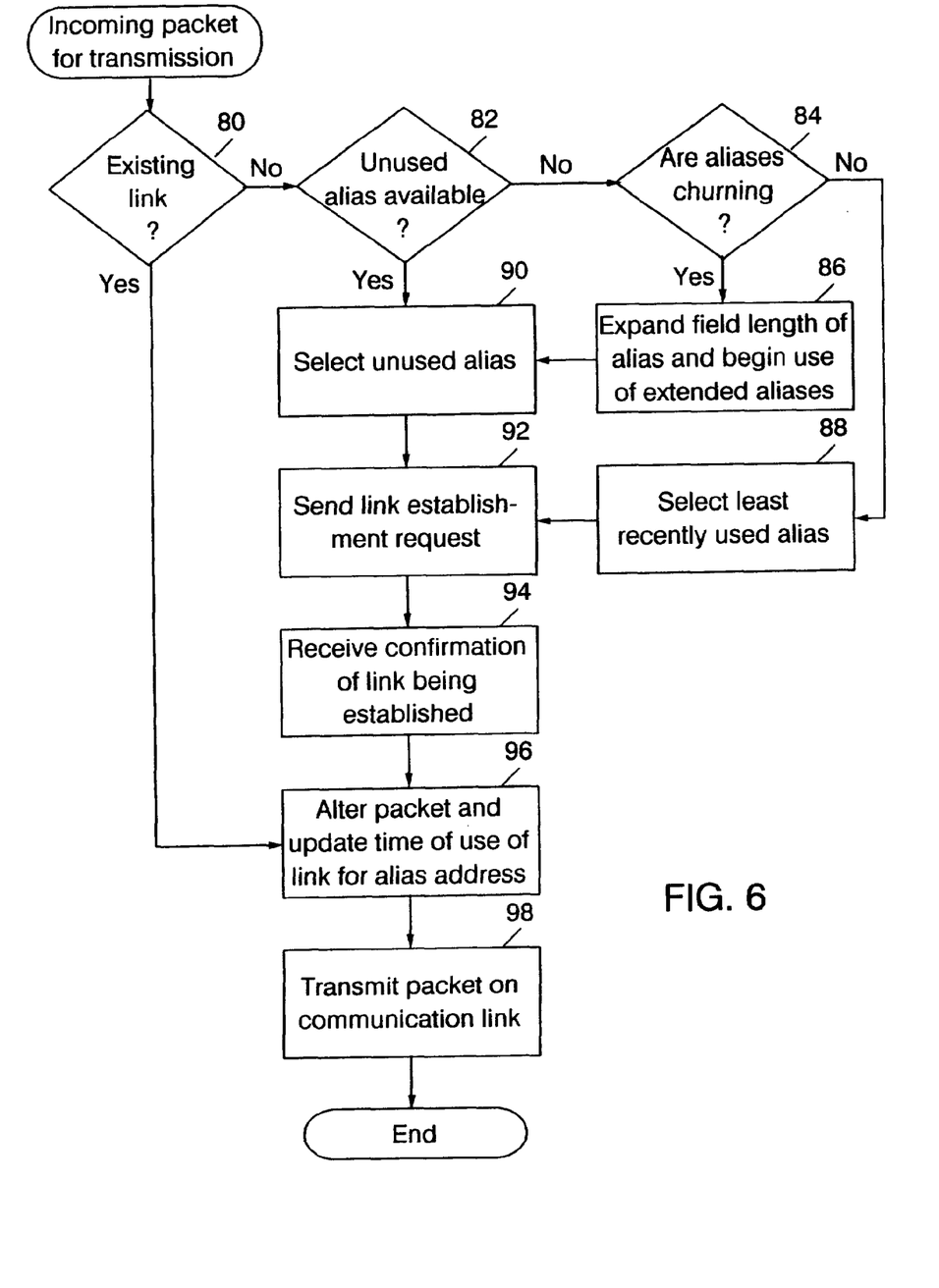
FIG. 6 is a flowchart illustrating operations carried out upon receipt of a packet by a communications interface according to an alternative embodiment of the present invention.

FIG. 6 illustrates the operation of the alternate embodiment of the present invention when receiving a packet for transmission on the communication link 16. As seen in FIG. 6, the communication interface 12 or 14 first determines if an existing link is associated with the source and destination addresses of the received packet (block 80). If no link exists, then it is determined if an unused alias address is available (block 82). If extended alias addresses are not in use then this determination is made based on the availability of single byte alias addresses. If extended addresses are in use then this determination is made based upon the availability of an extended alias address. If no unused alias address is available then it is determined if alias addresses are churning (block 84).

The determination of whether churning is occurring may be made by tests based on the ratio of link-establishment requests to data packets transmitted over the communication link or the time since the full address space was reassigned (for example, the time lapsed during the most recent 254 reassignment of 8-bit aliases), or other methods known to those of skill in the art. In one embodiment, churning is declared when the probability (as estimated by relative frequency of occurrence) becomes too great that an active link will be interrupted by alias reassignment, where a link is considered active if it was used during last T milliseconds.

If churning is occurring, then the field length of the alias address field is extended to more than one byte and extended aliases are used (block 86). An alias address is then selected from the unused extended alias addresses (block 90). If churning is not occurring, then the least recently used alias is selected for association with the source and destination addresses (block 88). If extended alias addresses are not in use then this selection is made based on the last use of single byte alias addresses. If extended addresses are in use then this selection is made based upon the last use of an extended alias address.

Figure 5C:
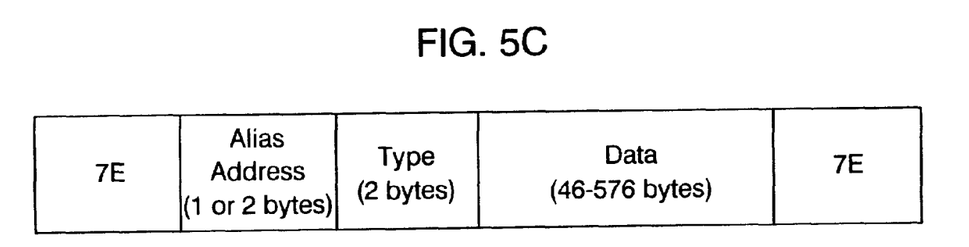
Figure 5D:
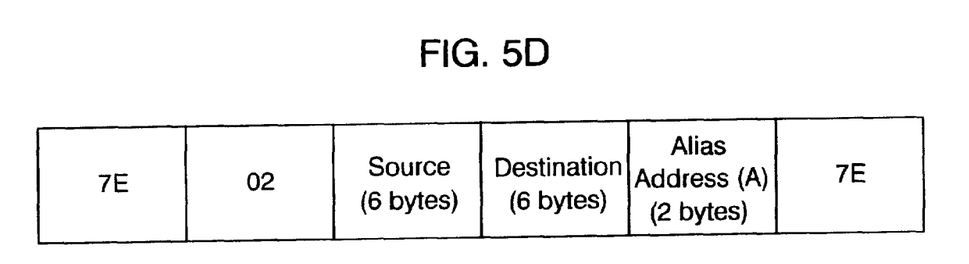

In either case, once an alias address is selected a link establishment request is sent on the communication link (block 92). The format of exemplary link establishment request packets are seen in FIG. 5D for an extended alias address and FIG. 2B for a single byte address. FIG. 2B is described above. FIG. 5D illustrates a data packet transmitted on the communication link 16 by a communication interface 12 or 14 to request that an extended alias address link be established. The format of the data packet includes "02" as the first byte of the data packet after the frame header. The "02" indicates that the packet is requesting that an extended alias address link be established. The next 12 bytes of the packet specify the source and destination address of the original data packet. The source and destination address are then followed by two bytes which specify the requested alias address to be associated with the source and destination addresses. Utilizing the format illustrated in FIG. 5D a link request is a 17 byte packet.

After transmitting the link establishment request, the communication interface 12 or 14 waits to receive confirmation that the link has been established (block 94). The operations for establishing a link (block 92 and 94) may be carried out as described above with reference to FIGS. 3 and 4 where a retry on error technique is used to establish the link.

Once the link is established the original data packet is altered as described above to remove the source and destination addresses and the CRC and to include the alias address so as to provide a reduced data packet (block 96). This reduced data packet is then sent on the link 16 (block 98). The format of exemplary reduced data packets are illustrated in FIG. 2A and FIG. 5C.

Figure 7:
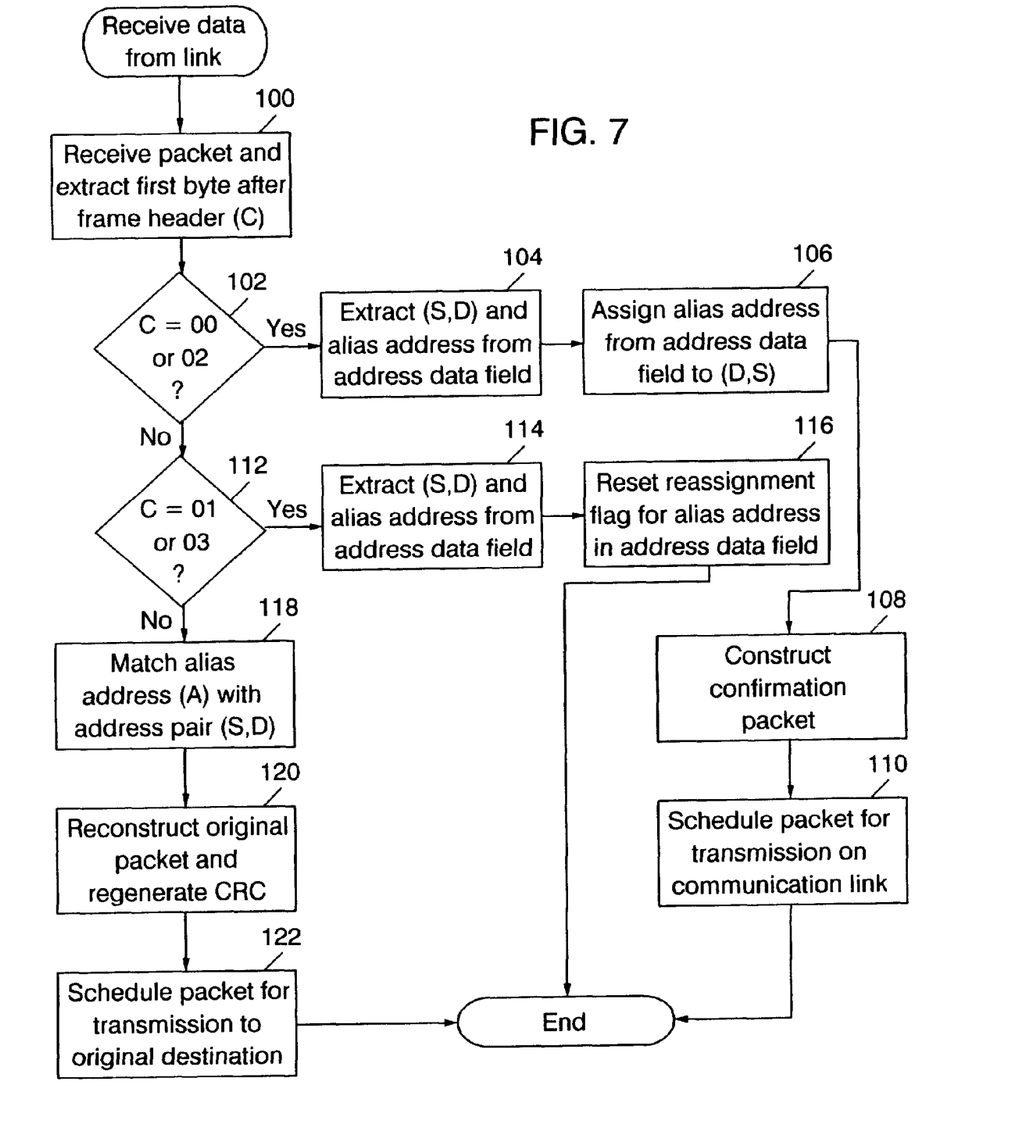
FIG. 7 is a flow chart illustrating operations carried out upon receipt of data from a communication link by a communications interface according to an alternative embodiment of the present invention.
Figure 8:
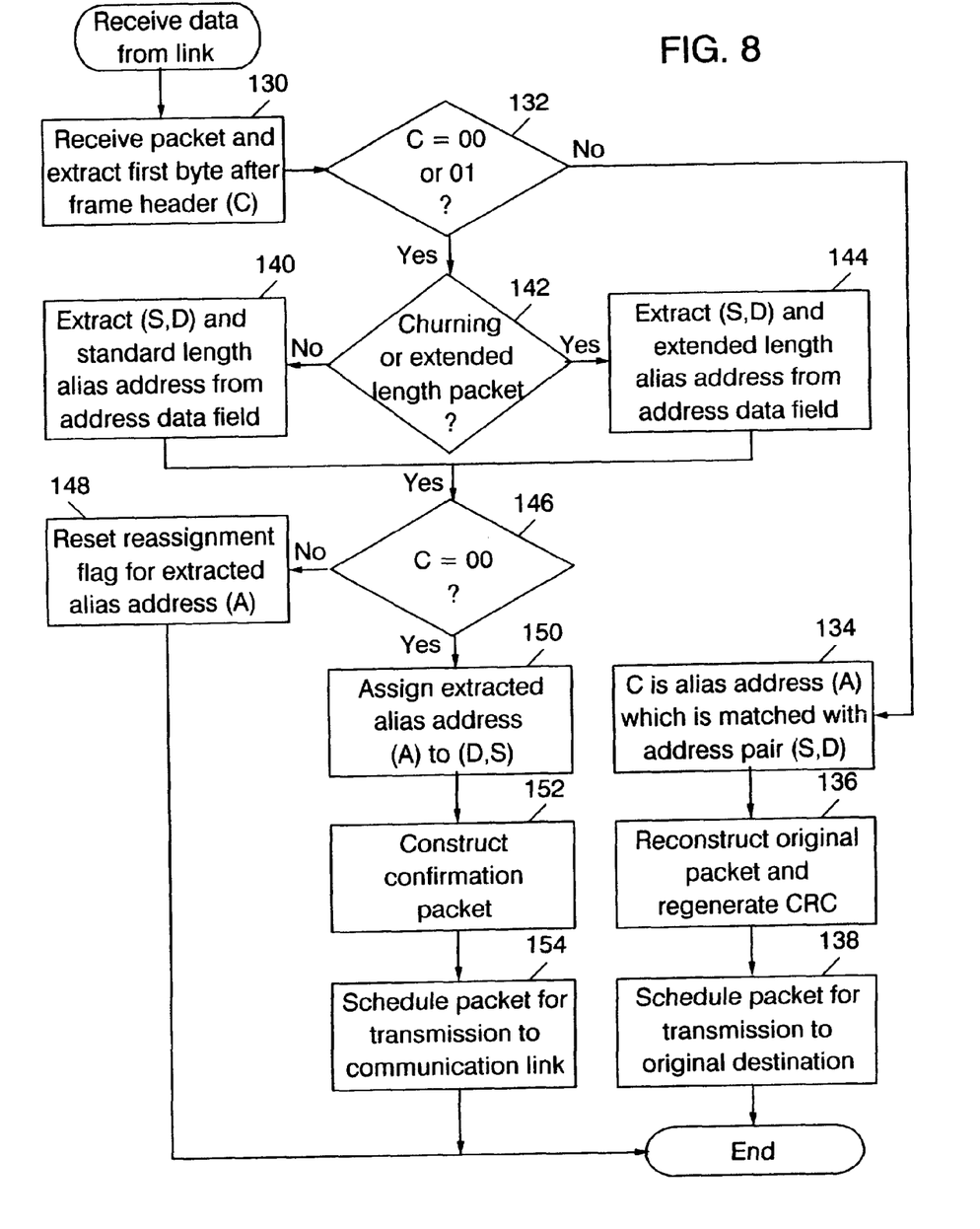
FIG. 8 is a flow chart illustrating operations carried out upon receipt of data from a communication link by a communications interface according to a second alternative embodiment of the present invention.

FIGS. 7 and 8 illustrate operations of alternative embodiments of the present invention which utilize extended alias addressing when a packet is received from the communication link 16. As seen in FIG. 7, when a packet is received from communication link 16, the first byte after the frame header is extracted (block 100). If the first byte is a "00" or "02" then the packet is a link establishment request and the appropriate source, destination and alias addresses are extracted from the packet (block 102 and block 104) based on the format of the packet (See FIG. 2B and FIG. 5D). The extracted alias address is then associated with the source and destination addresses (block 106). A confirmation packet is then constructed (block 108) and scheduled for transmission on the communication link 16 (block 110).

The format of the confirmation packet corresponds to the format of the establishment request. Accordingly, if a "00", link establishment request is received, then the "01" format confirmation packet illustrated in FIG. 2C is constructed. The confirmation packet format of FIG. 2C is described above. However, if the link establishment request received was a "02" extended alias address link establishment request then a confirmation packet having the format of FIG. 5E is constructed.

Figure 5E:
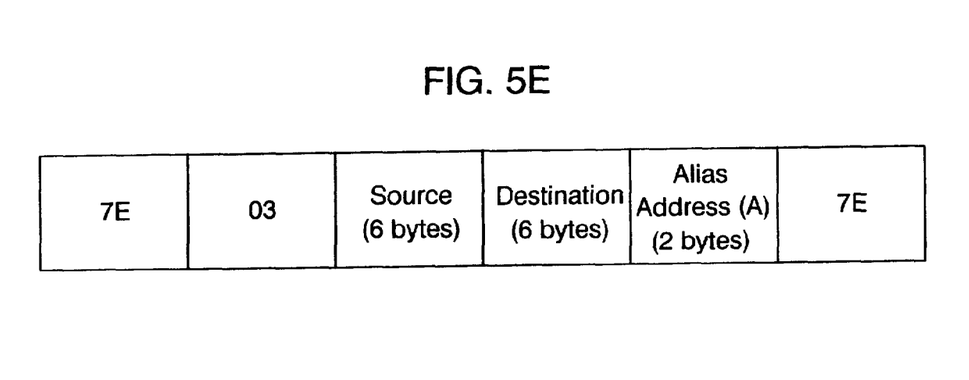

FIG. 5E illustrates a data packet transmitted on the communication link 16 by a communication interface 12 or 14 to confirm that an extended alias address link has been established. The format of the data packet includes "03" as the first byte of the data packet after the frame header. The "03" indicates that the packet is confirming that an extended alias address link has been established. The next 12 bytes of the packet specify the source and destination address of the original data packet. The source and destination address are then followed by two bytes which specify the requested alias address to be associated with the source and destination addresses. Utilizing the format illustrated in FIG. 5E a link confirmation packet is a 17 byte packet.

Returning now to FIG. 7, if the first byte after the frame header of the packet received from the communication link 16 is not a "00" or "02," then it is determined if the first byte after the frame header is "01" or "03" (block 112). If the first byte is a "01" or "03" then the packet is a confirmation packet and the appropriate source, destination and alias addresses are extracted from the packet (block 112 and block 114) based on the format of the packet (See FIG. 2C and FIG. 5E). The reassignment flag associated with the extracted alias address is then reset to indicate that that the link was successfully established (block 116).

If the first byte after the frame header of the received packet is not a "00", "01", "02" or "03" then the packet is a data packet of one of the formats shown in FIG. 2A or FIG. 5C. The alias address may be determined from the data packet by examining the first bit of the first byte after the frame header. If that bit is a "0" then a single byte alias address is used (see FIG. 5A), however, if that bit is "1" then an extended alias address is used (see FIG. 5B). In either case the alias address is extracted from the packet and matched with the associated source and destination pair (block 118). The original packet is then reconstructed, including the CRC (block 120) and scheduled for transmission to the destination (block 122).

FIG. 8 illustrates the operation of an alternative embodiment of the present invention which utilizes extended alias addressing when a packet is received from the communication link 16 but does not utilize separate request and confirmation packets for extended alias addresses. By utilizing the same methodology to determine if churning is occurring, both sides of the communication link 16 may determine if churning is occurring independently, thereby avoiding the need for explicit signaling that extended alias addresses are to be used.

As seen in FIG. 8, when a packet is received from communication link 16, the first byte after the frame header is extracted (block 130). If the first byte is a "00" or "01" the packet is either a link establishment request or a confirmation packet and it is then determined if churning is occurring (blocks 132 and 142) which would indicate whether or not single byte or extended alias addressing is used. Alternatively, the receiving communication interface could examine the first bit of the alias address field to determine if it was a "0" indicating single byte or a "1" indicating extended alias addressing. The communication interface could also determine the total length of the packet and, if that length is 16 bytes the single byte alias addressing is used. If the packet is 17 bytes, then extended alias addressing is used. In either case, after it is determined if single byte or extended alias addressing is used, the appropriate source, destination and alias addresses are extracted from the packet (block 140 or block 144) based on the format of the packet (See FIGS. 2B and 2C or FIG. 5D and 5E).

After extracting the alias address, it is then determined if the first byte after the frame header is "00" indicating a link request packet (block 146). If not, then the packet is a link confirmation and the reassignment flag associated with the alias address is reset (block 148). If the first byte after the frame header is a "00" then the packet is a link establishment request and the alias address is assigned to the source and destination (block 150) and the appropriate confirmation packet constructed (block 152). The confirmation packet is then scheduled for transmission on the communication link 16 (block 154).

Returning to block 132, if the first byte after the frame header is not a "00" or a "01" then the packet is a data packet. The alias address is extracted as described above utilizing the first bit of the address to determine if the address is extended (block 134). The original packet is then reconstructed (block 136) and scheduled for transmission to the destination (block 138).

The association of alias addresses with source and destination addresses may be made using any number of techniques for association of items. For example, a look-up table or a linked list may be used to create the association between the alias address and the source and destination addresses. In a table implementation the alias address, source and destination addresses and time of last use of the alias address may be maintained at each side of the communication link 16 so as to facilitate selection of the previously used alias address which has been used the least recently.

In the extended alias address embodiment of the present invention, a "trash-collection" routine periodically examines the time of last use for each link that has an extended-length alias, and long-idle links with extended addresses are removed from the tables at both ends of the communication link 16. In this way, alias length drifts back to its shortest option. Once no extended-field aliases are present in the tables, use of the "02" and "03" messages is held in abeyance until churning is once again detected, and the bridge tables are returned to their pre-expansion size.

Alternatively, the "trash-collection" routine could periodically remove from the tables at both ends links which have a time of last use older than a predefined threshold. When the total number of links falls below the number of links available in the set of non-extended alias addresses, the extended alias address links could be re-assigned to non-extended alias addresses for subsequent communications. As will be appreciated by those of skill in the art in light of present disclosure, other methods of returning the system to operating with non-extended alias addresses could also be utilized.

While the present invention has been described with respect to the Ethernet communication protocol, as will be appreciated by those of skill in the art, the teachings of the present invention may be applied to other communication protocols. For example, if the communication interfaces 12 and 14 perform IP routing functions and the Ethernet packets contain IP datagrams, the communications interfaces 12 and 14 could also strip the IP routing information from within the datagrams. In such a case the routing information could either be saved or recalculated to provide the next hop in the datagrams path. Thus, the present invention can be used with TCP/IP to further reduce overhead where the Ethernet and IP addressing are stripped and the gateway or router at each end re-bundles the IP datagram in an Ethernet packet which specifies the next hop in the IP path.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of reducing overhead in communication of messages having a message header over a communication link, the method comprising the steps of:

receiving a message to be transmitted on the communication link;

determining if an unused alias address from a first predefined set of alias addresses is available;

associating an unused alias address from the first predefined set of alias addresses with at least a portion of the header of the received message if an unused alias address is available;

associating a used alias address from the first predefined set of alias addresses with at least a portion of the header of the received message if an unused alias address is not available;

removing at least a portion of the message header from a subsequent message having a message header, a portion of which is substantially identical the message header of the received message, to provide a reduced data message; and transmitting the reduced data message and the associated alias address on the communication link.

2. A method according to claim 1, wherein said removing step is preceded by the step of transmitting the alias address and at least a portion of the message header associated with the message on the communication link.

3. A method according to claim 2, further comprising the step of receiving from the communication link a confirmation of the association of the at least a portion of the message header and the associated alias.

4. A method according to claim 1, further comprising the steps of:

receiving an alias address and a transmitted reduced data message from the communication link;

reconstructing the subsequent message from the at least a portion of the message header associated with the received alias address and the reduced data message.

5. A method according to claim 1, further comprising the step of identifying as used an alias address associated with at least a portion of a message header.

6. A method according to claim 1, wherein said step of associating a used alias address from the first predefined set of alias addresses comprises the steps of:

determining when each used alias address from the first predefined set of alias addresses was last utilized so as to provide a last time of use for each of the used alias addresses; and associating a used alias address with the oldest last time of use from the first predefined set of alias addresses with at least a portion of the header of the received message if an unused alias address is not available.

7. A method according to claim 1, wherein the at least a portion of the message header includes a source address and a destination address of the message.

8. A method according to claim 1, wherein the communication link is a wireless communication link.

9. A method according to claim 1, further comprising the steps of:

monitoring the association of alias addresses with the message headers; and increasing the number of alias addresses in the first predefined set of alias addresses based upon said monitoring so as to provide a second predefined set of alias address.

10. A method according to claim 9, wherein said increasing step comprises the step of transmitting an increased alias length notification on the communication link.

11. A method according to claim 9, further comprising the step of removing alias addresses from the second predefined set of alias addresses if the alias addresses are determined to be inactive.

12. A method according to claim 11, wherein the second predefined set of alias addresses comprises a combination of the first predefined set of alias addresses and a third predefined set of alias addresses.

13. A method according to claim 12, further comprising the step of reducing the number of alias addresses to the first predefined set of alias addresses if all of the third predefined set of alias addresses have been removed from the second predefined set of alias addresses.

14. A system for reducing overhead in communication of messages having a message header over a communication link, comprising:

means for receiving a message to be transmitted on the communication link;

means for determining if an unused alias address from a first predefined set of alias addresses is available;

means for associating an unused alias address from the first predefined set of alias addresses with at least a portion of the header of the received message if an unused alias address is available;

means for associating a used alias address from the first predefined set of alias addresses with at least a portion of the header of the received message if an unused alias address is not available;

means for removing at least a portion of the message header from a subsequent message having a message header, a portion of which is substantially identical the message header of the received message, to provide a reduced data message; and means for transmitting the reduced data message and the associated alias address on the communication link.

15. A system according to claim 14, further comprising means for transmitting the alias address and at least a portion of the message header associated with the message on the communication link.

16. A system according to claim 15, further comprising means for receiving from the communication link a confirmation of the association of the at least a portion of the message header and the associated alias.

17. A system according to claim 14, further comprising:

means for receiving an alias address and a transmitted reduced data message from the communication link; and means for reconstructing the subsequent message from the at least a portion of the message header associated with the received alias address and the reduced data message.

18. A system according to claim 14, further comprising means for identifying as used an alias address associated with at least a portion of a message header.

19. A system according to claim 14, wherein said means for associating a used alias address from the first predefined set of alias addresses comprises:

means for determining when each used alias address from the first predefined set of alias addresses was last utilized so as to provide a last time of use for each of the used alias addresses; and means for associating a used alias address with the oldest last time of use from the first predefined set of alias addresses with at least a portion of the header of the received message if an unused alias address is not available.

20. A system according to claim 14, wherein the at least a portion of the message header includes a source address and a destination address of the message.

21. A system according to claim 14, wherein the communication link is a wireless communication link.

22. A system according to claim 14, further comprising:

means for monitoring the association of alias addresses with the message headers; and means for increasing the number of alias addresses in the first predefined set of alias addresses based upon said monitoring so as to provide a second predefined set of alias address.

23. A system according to claim 22, wherein said means for increasing comprises means for transmitting an increased alias length notification on the communication link.

24. A system according to claim 22, further comprising means for removing alias addresses from the second predefined set of alias addresses if the alias addresses are determined to be inactive.

25. A system according to claim 24, wherein the second predefined set of alias addresses comprises a combination of the first predefined set of alias addresses and a third predefined set of alias addresses.

26. A system according to claim 25, further comprising means for reducing the number of alias addresses to the first predefined set of alias addresses if all of the third predefined set of alias addresses have been removed from the second predefined set of alias addresses.

27. A computer program product for reducing overhead in communication of messages having a message header over a communication link, the computer program product comprising:

a computer-readable storage medium having computer-readable program code means embodied in said medium, said computer-readable program code means comprising:

computer-readable program code means for receiving a message to be transmitted on the communication link;

computer-readable program code means for determining if an unused alias address from a first predefined set of alias addresses is available;

computer-readable program code means for associating an unused alias address from the first predefined set of alias addresses with at least a portion of the header of the received message if an unused alias address is available;

computer-readable program code means for associating a used alias address from the first predefined set of alias addresses with at least a portion of the header of the received message if an unused alias address is not available;

computer-readable program code means for removing at least a portion of the message header from a subsequent message having a message header, a portion of which is substantially identical the message header of the received message, to provide a reduced data message; and computer-readable program code means for transmitting the reduced data message and the associated alias address on the communication link.

28. A computer program product according to claim 27, further comprising computer-readable program code means for transmitting the alias address and at least a portion of the message header associated with the message on the communication link.

29. A computer program product according to claim 28, further comprising computer-readable program code means for receiving from the communication link a confirmation of the association of the at least a portion of the message header and the associated alias.

30. A computer program product according to claim 27, further comprising:

computer-readable program code means for receiving an alias address and a transmitted reduced data message from the communication link; and computer-readable program code means for reconstructing the subsequent message from the at least a portion of the message header associated with the received alias address and the reduced data message.

31. A computer program product according to claim 27, further comprising computer-readable program code means for identifying as used an alias address associated with at least a portion of a message header.

32. A computer program product according to claim 27, wherein said computer-readable program code means for associating a used alias address from the first predefined set of alias addresses comprises:

computer-readable program code means for determining when each used alias address from the first predefined set of alias addresses was last utilized so as to provide a last time of use for each of the used alias addresses; and computer-readable program code means for associating a used alias address with the oldest last time of use from the first predefined set of alias addresses with at least a portion of the header of the received message if an unused alias address is not available.

33. A computer program product according to claim 27, wherein the at least a portion of the message header includes a source address and a destination address of the message.

34. A computer program product according to claim 27, wherein the communication link is a wireless communication link.

35. A computer program product according to claim 27, further comprising:

computer-readable program code means for monitoring the association of alias addresses with the message headers; and computer-readable program code means for increasing the number of alias addresses in the first predefined set of alias addresses based upon said monitoring so as to provide a second predefined set of alias address.

36. A computer program product according to claim 35, wherein said computer-readable program code means for increasing comprises computer-readable program code means for transmitting an increased alias length notification on the communication link.

37. A computer program product according to claim 35, further comprising computer-readable program code means for removing alias addresses from the second predefined set of alias addresses if the alias addresses are determined to be inactive.

38. A computer program product according to claim 37, wherein the second predefined set of alias addresses comprises a combination of the first predefined set of alias addresses and a third predefined set of alias addresses.

39. A computer program product according to claim 38, further comprising computer-readable program code means for reducing the number of alias addresses to the first predefined set of alias addresses if all of the third predefined set of alias addresses have been removed from the second predefined set of alias addresses.

* * * * *